United States Patent
Archer, III

(10) Patent No.: US 10,906,823 B2
(45) Date of Patent: Feb. 2, 2021

(54) METHOD FOR TREATING SULFIDES IN WASTE STREAMS

(71) Applicant: BILL ARCHER, LLC, Charlotte, NC (US)

(72) Inventor: William Moseley Archer, III, Charlotte, NC (US)

(73) Assignee: BILL ARCHER, LLC, Charlotte, NC (US)

(*) Notice: Subject to any disclaimer, the term of this patent is extended or adjusted under 35 U.S.C. 154(b) by 0 days.

(21) Appl. No.: 16/793,130

(22) Filed: Feb. 18, 2020

(65) Prior Publication Data

US 2020/0223723 A1    Jul. 16, 2020

Related U.S. Application Data

(60) Continuation-in-part of application No. 16/397,123, filed on Apr. 29, 2019, now Pat. No. 10,570,038, which is a continuation of application No. 16/165,010, filed on Oct. 19, 2018, now Pat. No. 10,315,940, which is a division of application No. 14/854,403, filed on Sep. 15, 2015, now Pat. No. 10,112,853.

(60) Provisional application No. 62/965,252, filed on Jan. 24, 2020.

(51) Int. Cl.

| C01B 17/05 | (2006.01) |
|---|---|
| C01B 17/64 | (2006.01) |
| C01B 17/96 | (2006.01) |
| C02F 1/72 | (2006.01) |
| C02F 1/74 | (2006.01) |
| C02F 1/66 | (2006.01) |
| C02F 103/10 | (2006.01) |
| C02F 103/18 | (2006.01) |
| C02F 103/36 | (2006.01) |
| C02F 101/10 | (2006.01) |

(52) U.S. Cl.
CPC ............ *C02F 1/725* (2013.01); *C01B 17/05* (2013.01); *C01B 17/64* (2013.01); *C01B 17/96* (2013.01); *C02F 1/727* (2013.01); *C02F 1/74* (2013.01); *C02F 1/66* (2013.01); *C02F 2101/101* (2013.01); *C02F 2103/10* (2013.01); *C02F 2103/18* (2013.01); *C02F 2103/365* (2013.01); *C02F 2303/02* (2013.01); *C02F 2305/02* (2013.01)

(58) Field of Classification Search
CPC ......... C01B 17/05; C01B 17/64; C01B 17/96; C02F 1/725; C02F 1/74; C02F 2103/10; C02F 2103/18; C02F 2103/365; C02F 2303/02; C02F 2305/02; C02F 1/66; C02F 1/727; E21B 21/068
See application file for complete search history.

(56) References Cited

U.S. PATENT DOCUMENTS

| 2,868,617 A | 1/1959 | Mills |
| 2,897,140 A | 7/1959 | Gislon et al. |
| 3,104,951 A * | 9/1963 | Urban ............... C01B 17/05 423/576.4 |
| 3,226,320 A | 12/1965 | Meuly et al. |
| 3,913,673 A | 10/1975 | Barber |
| 4,076,621 A | 2/1978 | Hardison |
| 4,079,001 A * | 3/1978 | Haase ............... C02F 1/288 210/679 |
| 4,229,747 A | 10/1980 | Hwang |
| 4,520,072 A * | 5/1985 | Yoshino ............. B01J 19/127 210/506 |
| 4,615,714 A | 10/1986 | Turk et al. |
| 4,992,078 A | 2/1991 | Meszaros |
| 5,009,869 A | 4/1991 | Weinberg et al. |
| 5,470,356 A | 11/1995 | Meszaros |
| 5,585,051 A | 12/1996 | Hosie et al. |
| 5,922,087 A | 7/1999 | Nishioka et al. |
| 5,948,122 A | 9/1999 | Xu et al. |
| 5,961,670 A | 10/1999 | Cote et al. |
| 8,962,715 B2 | 2/2015 | Engelhardt et al. |
| 8,993,488 B2 | 3/2015 | Matza et al. |
| 10,112,853 B2 | 10/2018 | Archer, III |
| 10,315,940 B2 | 6/2019 | Archer, III |
| 10,570,038 B2 | 2/2020 | Archer, III |
| 2003/0038078 A1 | 2/2003 | Stamper et al. |
| 2013/0059357 A1* | 3/2013 | Bach ................ C12M 21/04 435/167 |
| 2013/0259743 A1 | 10/2013 | Keasler et al. |
| 2014/0166289 A1 | 6/2014 | Martinez et al. |
| 2014/0374104 A1 | 12/2014 | Seth |
| 2015/0368137 A1 | 12/2015 | Miller |
| 2017/0073257 A1* | 3/2017 | Archer ............... C02F 1/725 |
| 2018/0297845 A1 | 10/2018 | Mengel et al. |
| 2019/0047886 A1 | 2/2019 | Archer, III |
| 2019/0262769 A1* | 8/2019 | Jackson ............. C01B 17/64 |

FOREIGN PATENT DOCUMENTS

| FR | 1105484 A | 12/1955 |
| FR | 1230502 A | 9/1960 |
| GB | 788559 A | 1/1958 |
| GB | 910661 A | 11/1962 |
| GB | 1122889 A * | 8/1968 ............. C07B 45/06 |
| GB | 1122889 A | 8/1968 |

OTHER PUBLICATIONS

Maeda et al.,"1. Treatment of sulfur dye waste waters. V. Oxidation of sodium sulfide by oxygen", SciFinder. (Year: 1967).*
Venkataraman "The chemistry of Synthetic Dyes" (Year: 1974).*
The Chemistry of Synthetic Dyes ed., K Venkataraman, p. 32, 1974.
Maeda, Yoshimichi, et al.; Treatment of sulfur dye waste waters. V. Oxidation of sodium sulfide by oxygen, Kogyo Yosui, 1967, pp. 60-67, vol. 106, Database: CAPLUS; Abstract Only.

(Continued)

*Primary Examiner* — Lucas A Stelling
(74) *Attorney, Agent, or Firm* — Tristan A. Fuierer; Olive Law Group, PLLC

(57) ABSTRACT

A method for removing sulfides from an aqueous liquid, wherein the aqueous liquid is contacted with an oxidizer in the presence of fibrous material dyed with at least one sulfur dye or sulfurized vat dye, to convert the sulfides in the aqueous liquid to a non-toxic product.

19 Claims, No Drawings

(56) References Cited

OTHER PUBLICATIONS

Wolf, Friedrich, et al.; "Oxidation of sulfide ions by oxygen in the presence of sulfur dyes. II," Fortschritte der Wasserchemie und Ihrer Grenzgebiete, 1968, pp. 81-92, No. 10, Databse: CAPLUS; Abstract Only.
The Merck Index, Monograph No. M6107, (2013), via RSC.org.
Search Report for corresponding PCT/US2016/050336, dated Dec. 22, 2016.
Written Opinion for corresponding PCT/US2016/050336, dated Dec. 22, 2016.
U.S. Appl. No. 16/437,597; Office Action dated Aug. 29, 2019.
U.S. Appl. No. 16/437,597; Final Office Action dated Dec. 26, 2019.
Office Action, U.S. Appl. No. 16/733,436, dated Feb. 26, 2020.
Naito et al., "The Chemical behavior of Low Valence Sulfur Compounds. VII. The Oxidation of Ammonium Sulfide and Ammonium Sulfite with Compressed Oxygen in Aqueous Ammonia Solution." Bull. Chem. Soc. Jap., vol. 44, pp. 2434-2436 (1971).
Aspland, Jr.; A Series on Dyeing; Chapter 4: Sulfur Dyes and Their Application, Textile Chemist & Colorist, Mar. 1992, vol. 24, Issue 3, p. 21-24.
Fletcher, Lyn E.; "Potential Explosive hazards from Hydrogen Sulfide Production in Ship Bast and Sewage Tanks," Maritime Platforms Division, Aeronautical and Maritime Research laboratory, Australian Department of Defence, 1998.

\* cited by examiner

METHOD FOR TREATING SULFIDES IN WASTE STREAMS

CROSS REFERENCE TO RELATED APPLICATIONS

This application claims priority to U.S. Provisional Patent Application No. 62/965,252, filed on Jan. 24, 2020, which is hereby incorporated by reference herein in its entirety. This application is also a continuation-in-part application claiming priority to U.S. patent application Ser. No. 16/397,123 filed on Apr. 29, 2019, now allowed, which is continuation application claiming priority to U.S. patent application Ser. No. 16/165,010 filed on Oct. 19, 2018, now U.S. Pat. No. 10,315,940, which is a divisional application claiming priority to U.S. patent application Ser. No. 14/854,403 filed on Sep. 15, 2015, now U.S. Pat. No. 10,112,853, all of which are hereby incorporated by reference herein in their entirety. This application is also co-pending with U.S. patent application Ser. No. 16/684,832, filed on Nov. 15, 2019, now allowed, U.S. patent application Ser. No. 16/437,597, filed on Jun. 11, 2019, and U.S. patent application Ser. No. 16/733,436, filed on Jan. 3, 2020, all of which are hereby incorporated by reference herein in their entirety.

FIELD

The present invention relates to the treatment of aqueous solutions and gases comprising sulfides. More particularly, the present invention is a process for the treatment of sulfides present in an aqueous solution, wherein a fibrous material dyed with at least one sulfur dye or sulfurized vat dye is contacted with an aqueous solution in the presence of oxygen. The process oxidizes the sulfides in the aqueous solution to non-hazardous compounds. The present invention is useful for the remediation of sulfides found in natural and industrial waste streams, waste waters, industrial gas streams, sour natural gas, biogas and contaminated ambient air. The waste streams and ambient air comprising sulfides can result from industrial operations including, but not limited to, municipal and industrial waste water collection and treatment, animal waste processing, leather tanning, mining, ore refining, oil drilling, petroleum refining, natural gas and biogas processing, and hydraulic fracturing.

BACKGROUND

Sulfide is an unwanted component of many waste streams. It can occur naturally or as the result of industrial processes. It can occur in ambient air contaminated by industrial operations, waste water treatment, and farm waste management. Absorption liquids containing sulfides are generated when a gas containing hydrogen sulfide contacts an aqueous liquid to absorb the hydrogen sulfide, which is common in scrubber/absorption systems. While hydrogen sulfide has some solubility in water, the amount of gas dissolved is limited. Typically, the aqueous liquid will contain an alkali to convert the hydrogen sulfide into a water-soluble bisulfide or sulfide ion to greatly enhance the rate and amount of hydrogen sulfide that is absorbed into the liquid.

If alkaline sulfide-bearing solutions are neutralized or acidified, soluble sulfides are converted to hydrogen sulfide, potentially off-gassing from the liquid. Hydrogen sulfide gas is malodorous and toxic. Liquids that contain sufficiently high levels of sulfide are classified by US EPA regulations as reactive hazardous wastes because of their potential to generate hydrogen sulfide when acidified. Towards that end, it is important that sulfides present in the air, in gas streams and in aqueous fluids be removed. One method of removing sulfides is to oxidize them to a new compound that is not malodorous or toxic.

One method of eliminating sulfides in aqueous liquids is to oxidize them to a new compound that is not malodorous or toxic. The oxidation of sulfides in aqueous liquids can be accomplished chemically with oxidizing agents such as hydrogen peroxide, chlorine dioxide, hypochlorite salts, methylmorpholine-N-oxide, nitrate/nitrites. Oxidation can also be accomplished biologically. A third method is oxidation with molecular oxygen in the presence of a catalyst. Sulfides may also be treated by other methods such as absorption or sequestering.

The most common catalyst for sulfide oxidation is a chelated metal catalyst, most particularly iron chelated by an aminopolycarboxylic acid. The normal product of oxidation with this catalyst in aqueous fluids is elemental sulfur which precipitates and needs to be removed. The catalyst is typically regenerated with molecular oxygen, normally atmospheric air which can also degrade the catalyst.

The instant inventor previously disclosed a process for the treatment of sulfides present in an aqueous solution, wherein the aqueous solution is contacted with at least one sulfur dye or sulfurized vat dye in the presence of oxygen. A new process is described herein wherein fibrous material dyed with at least one sulfur dye or sulfurized vat dye is used as the vehicle to supply the catalyst, which avoids handling the liquid or powdered dyes and permits the easy separation of the catalyst from the liquid for reuse of the catalyst.

SUMMARY

In one aspect, the present invention relates to a method for treating sulfide in an aqueous liquid comprising contacting the aqueous liquid comprising at least one sulfide with an oxidizer in the presence of fibrous material dyed with at least one sulfur dye or sulfurized vat dye, to convert the at least one sulfide in the aqueous liquid to at least one non-toxic product and produce a treated liquid having a reduced concentration of the at least one sulfide.

In another aspect, the present invention relates to a method for treating sulfide in an aqueous liquid comprising contacting the aqueous liquid comprising at least one sulfide with an oxidizer in the presence of fibrous material dyed with at least one sulfur dye or sulfurized vat dye, to convert the at least one sulfide in the aqueous liquid to at least one non-toxic product and produce a treated liquid having a reduced concentration of the at least one sulfide, wherein the aqueous liquid comprises wastewater selected from the group consisting of oilfield wastewater; oil production wastewater; gas production wastewater; impoundment wastewater; anaerobic or facultative wastewater treatment operations including human, animal and industrial wastes; raw municipal wastewater; and any combination thereof.

In still another aspect, the present invention relates to a method for treating sulfide in an aqueous liquid comprising introducing a gas comprising hydrogen sulfide to an aqueous liquid to absorb at least a portion of the hydrogen sulfide to form the aqueous liquid comprising at least one sulfide, contacting the aqueous liquid comprising at least one sulfide with an oxidizer in the presence of fibrous material dyed with at least one sulfur dye or sulfurized vat dye, to convert the at least one sulfide in the aqueous liquid to at least one non-toxic product and produce a treated liquid having a reduced concentration of the at least one sulfide.

Other aspects, features and embodiments of the invention will be more fully apparent from the ensuing disclosure and appended claims.

DETAILED DESCRIPTION

Sulfides can be generated by industrial processes, such as oil and gas processing, and by municipal and industrial waste water handling and treatment. Biological activity can produce sulfides through degradation of organic wastes in the absence of oxygen. This anaerobic generation of sulfide is quite common in wastewater collection and treatment. Anaerobic digestion of wastewater biological solids produces methane rich biogas which typically contains hydrogen sulfide. Anaerobic activity in landfills can also produce biogas containing hydrogen sulfide. Numerous industrial processes generate hydrogen sulfide which can be captured by absorbers/scrubbers to produce non-volatile compounds such as sodium bisulfide. Crude natural gas and biogas frequently contain hydrogen sulfide as a contaminant which can be removed by absorption in an aqueous solution. Hydrogen sulfide can also be an ambient air pollutant which can be present in industrial settings and in environments where anaerobic degradation of organic compounds is occurring, such as concentrated animal feeding buildings and pits.

Absorption liquids containing sulfides are generated when a gas containing hydrogen sulfide is processed in an absorber or scrubber where it contacts an aqueous liquid to absorb the hydrogen sulfide. While hydrogen sulfide has some solubility in water, the amount of gas dissolved is limited. Typically, the aqueous liquid will contain an alkali to convert the hydrogen sulfide into a water-soluble bisulfide or sulfide ion to greatly enhance the rate and amount of hydrogen sulfide that is absorbed into the liquid. The base can be added as a single charge or can be added throughout the absorption as alkalinity is consumed by the hydrogen sulfide. In some instances, gases other than hydrogen sulfide may be in the gas stream to be absorbed. If the gas happens to be an alkaline gas, such as ammonia, the amount of base added (if any) to the absorption liquid can be reduced.

As defined herein, the term sulfide includes all forms of inorganic sulfide including hydrogen sulfide, bisulfide ions, sulfide ions and polysulfide ions.

The present invention provides an alternative method for utilizing sulfur dyes for the treatment of sulfides contained in aqueous liquids. It was unexpectedly discovered that fibrous materials dyed with at least one sulfur dye or sulfurized vat dye will act as a catalyst to convert sulfides contained in an aqueous solution, in the presence of oxygen, e.g., air, to non-hazardous products. A substrate employed in this method can be a fibrous material which can be dyed with at least one sulfur dye or sulfurized vat dye.

As used herein, "fibrous material" includes a structure that comprises a plurality of fibers. For example, in one embodiment, the fibrous material is a cellulosic fiber including, but not limited to, cotton, wood, paper, pulp, and/or recycled cellulosic fibrous material, whether bleached or unbleached. In another example, the fibrous material may comprise synthetic staple fibers (e.g., polyolefins, polyesters, polyamides, poly(lactic acid), or cellulose derivatives such as lyocell or rayon), animal-based fibers (e.g., hair, wool), and mixtures thereof. The fibrous material can be a mix of cellulose fibers, synthetic staple fibers, and animal-based fibers. In still another example, in addition to fibers, the fibrous material may comprise a plurality of filaments, such as polymeric filaments and/or polysaccharide filaments such as cellulosic and starch filaments. The fibrous material can be a fabric, composite, non-woven, woven, air laid, or wet laid media having the appropriate formability, stiffness, tensile strength, compressibility, and mechanical stability for the processes described herein. The fibrous material can be shredded, treated in a blender, or otherwise treated to reduce particle size to provide increased contact of the sulfur dye or sulfurized vat dye with the soluble sulfide reactants. The fibrous materials can be reduced to a pulp-like consistency to facilitate suspension in the sulfide-containing liquid with minimal agitation. Some pulps can be less dense than the aqueous liquid to be treated, providing an opportunity to oxidize sulfides rising to the surface of the aqueous liquid, particularly in surface impoundments and tanks with minimal agitation. Alternatively, small pieces of fibrous material can be held in a water permeable enclosure within a treatment unit. Large pieces of dyed fabric or paper can be held in place in a treatment unit so that treated liquid can be discharged and refilled repeatedly.

As defined herein, "dyed" with or "dyeing" fibrous materials with sulfur dyes or sulfurized vat dyes involves contacting the fibrous material with at least one sulfur dye or sulfurized vat dye in its' water soluble Leuco (reduced) form, either by starting with a pre-reduced Leuco dye or reducing an oxidized dye or solubilized dye to the Leuco form in situ. Without being bound by theory, it is thought that the Leuco dye molecules have affinity for the fibrous material as the result of hydrogen bonding and other intermolecular attractions. After rinsing out excess dye, the dye in the fibrous material is oxidized to the insoluble oxidized form to fix the dye to the fibrous materials. In some embodiments, the dye is chemically attached, either ionically or covalently, to the fibrous material, depending on the dye and the fibrous material. In other embodiments, the dye is absorbed on or in the fibrous material, depending on the dye and the fibrous material.

As used herein, "dyed fibrous material" or "fibrous material dyed with a sulfur dye or sulfurized vat dye" is synonymous with a fibrous material dyed with at least one sulfur dye or sulfurized vat dye.

Using fibrous material dyed with at least one sulfur dye or sulfurized vat dye as the vehicle to supply the catalyst avoids handling the liquid or powdered dyes. It also has the significant advantage of allowing easy separation of the fibrous material catalyst from the treated solution. For suspended catalysts, simple screening or filtration of the treated mixture will remove the fibrous material along with substantially all of the dye from the treated solution. Fibrous material dyed with at least one sulfur dye or sulfurized vat dye can be easily separated and reused numerous times. If the fibrous material dyed with at least one sulfur dye or sulfurized vat dye is not in a free suspension in the treatment liquid but immobilized in a treatment unit, simple draining can separate the treated liquid from the fibrous material in said unit. Having the catalyst in the form of dyed fibrous material also proved quite efficient, requiring smaller amounts of the active dye treating the sulfides relative to having the dye in solution or suspension.

Maintaining the absorption liquid or aqueous liquid comprising the sulfides at a pH of neutral or above (i.e., pH greater than or equal to 7, preferably in a range from about 7 to about 11) during treatment will provide the added benefit of converting the sulfides to a water soluble product, including thiosulfate or some other soluble oxysulfur compound such as tetrationate, and avoiding the precipitation of elemental sulfur. To maintain the pH at greater than or equal to 7, at least one base can be added, wherein said at least one base can comprise a species selected from the group consisting of sodium hydroxide, potassium hydroxide, ammonia, ammonium hydroxide, calcium hydroxide, magnesium hydroxide, and any combination thereof. The pH can be monitored and adjusted continuously or periodically, as readily understood by the person skilled in the art. The form of the thiosulfate depends on which alkali (such as: sodium hydroxide, potassium hydroxide, ammonium hydroxide, calcium hydroxide, or magnesium hydroxide) used in the absorption liquid. At pH values dropping below 7, elemental sulfur will begin to precipitate. In many applications, the soluble nature of the neutral to alkaline treatment product will be an advantage. Given that thiosulfate is produced under alkaline treatment conditions, thiosulfate can be produced as a valuable product by oxidation of bisulfide ions in the presence of fibrous material dyed with at least one sulfur dye or sulfurized vat dye. In a preferred embodiment, the sulfides are converted to a water-soluble product, including thiosulfate, while avoiding the precipitation of elemental sulfur. Advantageously, the methods described herein do not require any electrolytic processing.

Preferably, the process described herein is carried out in a treatment unit or container, which can be a covered unit or container or an uncovered unit or container, as readily determined by the person skilled in the art. The mixture in the treatment unit or container can be agitated, for example by stirring, sonication, aeration, shaking, or any combination thereof.

The process may be utilized in numerous waste water treatment units including, but not limited to sewers, tanks, vessels, and surface impoundments. Addition of a fibrous material dyed with at least one sulfur dye or sulfurized vat dye and introduction of oxidizer to virtually any sulfide bearing aqueous solution will substantially reduce the sulfide concentrations. Sulfide treatment systems can be set up to operate continuously or as batch processes. Having the fibrous material dyed with the at least one sulfur dye or sulfurized vat dye provides advantages over adding the dye directly as a liquid or a powder to the treatment unit. In addition to the convenience of not having to handle concentrated dyes, the fibrous nature of the fibrous material catalyst allows for very simple separation of the catalyst from the treated liquid. Following the remediation of the sulfides in the aqueous absorption liquid, the liquid is easily separated from the fibrous material. For example, depending on the fibrous material and the treatment unit, the separation can include, but is not limited to, draining the liquid from the treatment unit comprising the fibrous material, filtration, centrifugation, screening, straining and settling while extracting the liquid off the top.

The method can be operated over a wide range of conditions, including temperature, sulfide concentration, oxygen input, and catalyst concentration and particle size. The rate of sulfide oxidation is dependent, at least to some extent, on all these parameters. Conditions that increase the surface area of the fibrous material will typically improve the rate and efficiency of the sulfide oxidation. While a higher temperature will generally increase the reaction rate, a higher temperature will also tend to reduce the solubility of oxygen in water. Solubility of oxygen in water is increased by higher pressure. The optimum conditions for best economy depend greatly on the particular circumstances. Since the present invention has utility in a vast range of applications, the optimum conditions will vary widely also, as understood by the person skilled in the art.

It should be understood that the oxidizer includes, but is not limited to, a gas comprising oxygen such as air, pure oxygen, or a gas comprising oxygen in some percentage between about 10% and about 100%, by volume. In an uncovered treatment unit, the source of oxygen can come from the surface transfer of oxygen from the air for treatment, the source of oxygen can be introduced into the aqueous solution, e.g., using a gas bubbler, or a combination of both. In a covered treatment unit, the source of oxygen can be introduced into the aqueous solution using a gas bubbler or equivalent thereof to assist in the oxidation of the sulfides in the aqueous solution.

An oxidation/reduction potential (ORP) meter can be used to determine when the sulfides have been substantially treated. In most matrices, an ORP reading will become less negative as sulfide is oxidized. Depending on the matrix, a reading less negative than about −150 mV usually indicates that the sulfides have been substantially treated.

In one aspect, the present invention relates to a method for treating sulfide in an aqueous liquid comprising contacting the aqueous liquid comprising at least one sulfide with an oxidizer in the presence of fibrous material dyed with at least one sulfur dye or sulfurized vat dye, to convert the at least one sulfide in the aqueous liquid to at least one non-toxic product and produce a treated liquid having a reduced concentration of the at least one sulfide. The aqueous liquid can comprise wastewater selected from the group consisting of oilfield wastewater; oil production wastewater; gas production wastewater; impoundment wastewater; anaerobic or facultative wastewater treatment operations including human, animal and industrial wastes; raw municipal wastewater; and any combination thereof. The method can further comprise the introduction of a gas comprising hydrogen sulfide, e.g., biogas, to an aqueous liquid to absorb at least a portion of the hydrogen sulfide to form the aqueous liquid comprising at least one sulfide.

In one embodiment, the first aspect relates to a method for treating oilfield waste water. The method comprises contacting the oilfield waste water comprising at least one sulfide with an oxidizer in the presence of fibrous material dyed with at least one sulfur dye or sulfurized vat dye to oxidize the at least one sulfide to a non-toxic soluble byproduct, such as soluble sulfur-containing salts, thus providing a treated water having a reduced concentration of sulfide relative to the oilfield waste water. The method can further comprise separating the non-toxic soluble byproduct from the fibrous material in the treated water.

In another embodiment, the first aspect relates to a method of treating sulfides in an aqueous liquid generated during a process selected from at least one of oil and gas production. The method comprises contacting the aqueous liquid comprising at least one sulfide with an oxidizer in the presence of fibrous material dyed with at least one sulfur dye or sulfurized vat dye to oxidize the at least one sulfide to a non-toxic soluble byproduct such as soluble sulfur-containing salts, thus providing a treated water having a reduced concentration of sulfide. The method can further comprise separating the non-toxic soluble byproduct from the fibrous material in the treated water.

In yet another embodiment, the first aspect relates to a method of treating sulfides in a wastewater impoundment, also known as a surface impoundment. Wastewater (or surface) impoundments are natural topographic depressions, man-made excavations, or diked areas formed primarily of earthen materials (optionally lined with clay or man-made materials) that are used to hold an accumulation of liquid waste. The method comprises contacting the waste water comprising at least one sulfide with oxygen in the presence of fibrous material dyed with at least one sulfur dye or sulfurized vat dye to oxidize the at least one sulfide to a non-toxic soluble byproduct such as soluble sulfur-containing salts, thus providing a treated water having a reduced concentration of sulfide. In one embodiment, at least a portion of said oxygen is supplied by surface transfer of atmospheric oxygen. The method can further comprise separating the non-toxic soluble byproduct from the fibrous material in the treated water.

The first aspect further relates in part to a method of treating water comprising sulfides, for example, wastewaters comprising biologically degradable constituents which generate sulfides during anaerobic degradation. As defined herein, "biologically degradable constituents" includes waste from animals such as humans, dairy cattle, beef cattle, swine, poultry, horses, rabbits, and other concentrated animal raising operations. Animal waste can comprise a mixture of feces and urine as well as wasted feed, bedding and water. Waste characteristics are generally affected by diet, species and the growth stage of the animals, and the waste collection method used, including the amount of water added to dilute the waste. Typically, animal waste is about 80% to about 95% liquid by weight due to urine, sloppy drinking, animal washing and flush water. As such, the animal waste may be pretreated with mechanical systems to remove any unwanted material, larger solids and excess liquids from the animal waste before treatment using the process described herein, wherein the pretreating includes systems comprising at least one of a screw press, a centrifuge, a vibrating screen, mesh screening, a belt filter, a hydrocyclone and other systems that may further reduce particle size and/or remove unwanted large material to ensure easy processing using the method described herein. The biologically degradable constituents may be treated in an anaerobic treatment unit, which includes holding the biologically degradable constituents in an air-tight tank or a covered surface impoundment. Bacteria will degrade the biologically degradable constituents in these conditions, generating a number of products including, but not limited to, sulfides and methane gas. The methane can be harvested and burned/combusted for energy production. Advantageously, anaerobic treatment does not reduce the nutrients in the biologically degradable constituents, although it may alter the form of the nitrogen (more ammonia) and phosphorus (more orthophosphate). Accordingly, the biologically degradable constituents can be further processed to produce additional products such as fertilizer. Disadvantageously, the sulfides need to be separated from the methane gas to maximize the potential energy of the methane. The biologically degradable constituents may also be treated in a facultative anaerobic treatment unit in which there are both anaerobic and aerobic treatment zones. This type of treatment occurs typically in open surface impoundments and tanks when there is insufficient mixing and/or oxygen input to result in completely aerobic treatment conditions. Hydrogen sulfide and methane will commonly be produced in the anaerobic zone. While a portion of the sulfide may be oxidized in the aerobic zone, most facultative units will not eliminate all the hydrogen sulfide and will emit a significant portion to the atmosphere.

Accordingly, in a further embodiment, the first aspect relates to a method for treating sulfides generated in anaerobic or facultative waste-water treatment operations including treatment of human, animal or industrial wastes. The method comprises contacting the waste-water comprising the sulfides with an oxidizer in the presence of fibrous material dyed with at least one sulfur dye or sulfurized vat dye to oxidize the at least one sulfide to a non-toxic soluble byproduct such as soluble sulfur-containing salts, thus providing a treated waste water having a reduced concentration of sulfide. For example, the method can comprise introducing the waste water from an anaerobic or facultative treatment unit to a treatment unit comprising a fibrous material dyed with at least one sulfur dye or sulfurized vat dye catalyst; and aerating the waste water with a gas comprising oxygen to oxidize the sulfide(s) to yield treated water, wherein the treated water has a reduced concentration of sulfide(s) relative to the wastewater.

A gaseous renewable fuel from waste feedstock can be generated by the anaerobic digestion of organic material derived from plants, vegetation, municipal waste, animal waste, animal byproducts, manure, sewage sludge, food waste, food processing waste, agricultural residues including corn stover and wheat straw and/or other biomass, hereinafter referred to collectively as "waste organic material." The combustible product of the anaerobic digestion is referred to herein as "biogas" which may be produced by anaerobic digestion of any waste organic material. The biogas may be produced by decomposing waste organic material under anaerobic conditions, such as in landfills. Within an anaerobic treatment unit, bacteria will degrade the waste organic material, generating a number of products including, but not limited to, hydrogen sulfide, carbon dioxide, and methane gas. The methane can be harvested and burned/combusted for energy production, but first the hydrogen sulfide should be separated from the methane gas to prevent the corrosive and other deleterious effects of combusting hydrogen sulfide.

Accordingly, in a further embodiment, the first aspect relates to a method for removing hydrogen sulfide from biogas and treating removed hydrogen sulfide, said method comprising: introducing the biogas to an aqueous absorption liquid to absorb at least a portion of the hydrogen sulfide in the liquid; harvesting any gas remaining, wherein the remaining gas has a concentration of hydrogen sulfide that is reduced relative the biogas; introducing a fibrous material dyed with at least one sulfur dye or sulfurized vat dye catalyst to the aqueous absorption liquid; introducing a gas comprising oxygen to oxidize sulfides in the aqueous absorption liquid to soluble sulfur-containing salts.

In a further embodiment, the first aspect relates to a method for treating sulfides present in raw municipal wastewaters in sewer lines, manholes, sumps and tanks associated with collection and conveyance of said wastewater. The method comprises contacting said wastewater comprising the sulfides with an oxidizer in the presence of fibrous material dyed with at least one sulfur dye or sulfurized vat dye to oxidize the at least one sulfide to a non-toxic soluble byproduct such as soluble sulfur-containing salts, thus providing a treated waste water having a reduced concentration of sulfide. For example the method can comprise adding fibrous material to the waste water or affixing fabric or other fibrous material to the sewer, manhole, sump or vessel such that it contacts the waste water and an oxidizer, e.g., oxygen in the air above the liquid or air or other oxidizer introduced into the waste water.

In still another embodiment, the first aspect relates to a method for treating sulfide in an aqueous liquid comprising introducing a gas comprising hydrogen sulfide to an aqueous liquid to absorb at least a portion of the hydrogen sulfide to form the aqueous liquid comprising at least one sulfide, contacting the aqueous liquid comprising at least one sulfide with an oxidizer in the presence of fibrous material dyed with at least one sulfur dye or sulfurized vat dye, to convert the at least one sulfide in the aqueous liquid to at least one non-toxic product and produce a treated liquid having a reduced concentration of the at least one sulfide. The method can further comprise separating the non-toxic soluble byproduct from the fibrous material in the treated water.

In a second aspect, the present invention is a combined method for collecting and treating hydrogen sulfide present as a pollutant in ambient air. The method comprises absorbing the hydrogen sulfide out of the ambient air into an aqueous absorption liquid and contacting the aqueous absorption liquid with fibrous material dyed with at least one sulfur dye or sulfurized vat dye to substantially oxidize absorbed hydrogen sulfide to a non-toxic soluble byproduct such as soluble sulfur-containing salts. In this embodiment, the ambient air supplies the oxidizer, e.g., oxygen in air, which is absorbed into the aqueous absorption liquid concurrently with the hydrogen sulfide.

In a third aspect, the present invention is a method for producing thiosulfate ions. The method comprises contacting an aqueous liquid comprising bisulfide ions with an oxidizer in the presence of a fibrous material dyed with at least one sulfur dye or sulfurized vat dye to produce an aqueous liquid comprising soluble thiosulfate salt(s). The method can further comprise separating the soluble thiosulfate salt(s) from the fibrous material.

The sulfur dyes and sulfurized vat dyes which may be used in accordance with the processes of the invention include those which are either 1) provided in the non-reduced (oxidized) form (where sulfur atoms attached to the dye chromophore are predominantly connected to other chromophore units through disulfide or polysulfide linkages), 2) provided as pre-reduced (Leuco) sulfur dyes (where sulfur atoms exist primarily as thiolate salts), or 3) provided as solubilized sulfur dyes where Bunte salt groups impart water solubility under non-reducing conditions.

Sulfurized vat dyes are chemically and structurally similar to sulfur dyes including having the disulfide/thiolate functionality. They are given the vat dye designation because they are typically dyed using a vat dye process.

Sulfur dyes and sulfurized vat dyes can be dissolved by reducing agents such as sodium sulfide, sodium dithionite or sodium hydrosulfide under alkaline conditions. This reduction breaks the disulfide bonds producing very polar thiolate groups (Dye-S$^-$). This form of the dye is called a Leuco Sulfur Dye. The oxidation/reduction of the sulfur atoms attached to the chromophore structure is reversible as follows:

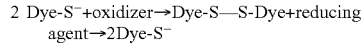

2 Dye-S$^-$+oxidizer→Dye-S—S-Dye+reducing agent→2Dye-S$^-$

Sulfur dyes can also exist as a non-reduced, water soluble form characterized by thiosulfate groups attached to the chromophores (Dye-S—SO$_3^-$). This form is called a Bunte Salt and is categorized as a Solubilized Sulfur Dye. Solubilized Sulfur Dyes can be prepared by oxidative reaction of a sulfur dye with sulfite. Solubilized Sulfur Dyes will convert to one of the other dye forms when reacted with sulfides. Any of the three forms of sulfur dyes may be used in accordance with this method.

During sulfur dye production and dyeing processes, sulfides can undergo oxidation when Leuco dyes are converted to the insoluble non-reduced (oxidized) form with air. However, this oxidation of sulfides has not been attributed to the presence of the dye. There is no evidence that anyone has recognized that the addition of sulfur dyes or sulfurized vat dyes will act as a catalyst for the treatment of unwanted sulfides in waste waters and other aqueous liquids.

Without being bound by theory, it is believed that the mechanism of the sulfide treatment of the present invention is that the sulfur dye in the non-reduced (oxidized) form reacts with sulfide in solution to oxidize the sulfide to a harmless compound, such as sodium thiosulfate. In reacting the sulfur dye in the sulfide treatment process, the sulfur dye is converted to the Leuco (reduced) form of the dye. When the thus produced Leuco form of the dye is contacted with oxygen or another suitable oxidizer, the Leuco dye is restored to the non-reduced state ready to react with more sulfide. If the absorption liquid is contacted with a Leuco form of the sulfur dye; it is required to simultaneously contact the absorption liquid with an oxidizer such as air to provide the sulfide treatment. While the exact structures and molecular weights of most sulfur dyes are not known, the molecular weight of an individual chromophore unit of Sulfur Black 1 is believed to be about 548 based on a common proposed structure. This molecular weight is about 14 times the weight of a sulfide ion. The method of this invention is demonstrated to be very effective at molar ratios of sulfur dye to sulfide that are less than 1 mole %. More preferably, the molar ratio of sulfur dye to sulfide is effective at less than about 0.6 mole %. This strongly supports that the dye used in this method acts as a catalyst to provide the sulfide treatment.

Sulfur dyes and sulfurized vat dyes which may be utilized in accordance with the method of the invention include but are not limited to the following ("CI" stands for "Colour Index"):

C.I. Sulfur Yellow 1, 2, 3, 4, 5, 6, 8, 9, 10, 11, 12, 13, 14, 16, 20 and 23, C.I. Leuco Sulfur Yellow 2, 4, 7, 9, 12, 15, 17, 18, 21, 22 and 23 and C.I. Solubilized Sulfur Yellow 2, 4, 5, 19, 20 and 23;

C.I. Sulfur Orange 1, 2, 3, 4, 5, 6, 7 and 8, C.I. Leuco Sulfur Orange 1, 3, 5 and 9 and C.I. Solubilized Sulfur Orange 1, 3, 5, 6, 7 and 8;

C.I. Sulfur Red 1, 2, 3, 4, 5, 6, 7, 8, 9, 10, 12 and 13, C.I. Leuco Sulfur Red 1, 4, 5, 6, 11 and 14 and C.I. Solubilized Sulfur Red 3, 6, 7, 11 and 13;

C.I. Sulfur Violet 1, 2, 3, 4 and 5, C.I. Leuco Sulfur Violet 1 and 3 and C.I. Solubilized Sulfur Violet 1;

C.I. Sulfur Blue 1, 2, 3, 4, 5, 6, 7, 8, 9, 10, 11, 12, 13, 14, 15, 16, 17, 18 and 19, C.I. Leuco Sulfur Blue 1, 2, 3, 5, 7, 8, 9, 11, 13, 15 and 20 and C.I. Solubilized Sulfur Blue 1, 2, 4, 5, 6, 7, 10, 11, 13, and 15;

C.I. Sulfur Green 1, 2, 3, 4, 5, 6, 7, 8:1, 9, 10, 11, 12, 13, 14, 15, 16, 17, 18, 19, 20, 21, 22, 23, 24, 25, 26, 27, 28, 29, 31, 32 and 33, C.I. Leuco Sulfur Green 1, 2, 3, 4, 7, 11, 16, 30, 34, 35, 36, and 37 and C.I. Solubilized Sulfur Green 1, 2, 3, 6, 7, 9, 19, 26, and 27;

C.I. Sulfur Brown 1, 2, 3, 4, 5, 6, 7, 8, 9, 10, 11, 12, 13, 14, 14:1, 15, 15:1, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53:1, 54, 55, 56, 57, 58, 59, 60, 61, 62, 63, 64, 65, 66, 67, 68, 69, 70, 71, 72, 73, 74, 76, 77, 78, 79, 84, 85, 87, 88, 89, 90, 91, 93, and 94; C.I. Leuco Sulfur Brown 1, 3, 4, 5, 8, 10, 11, 12, 14, 15, 21, 23, 26, 31, 37, 43, 44, 81, 82, 86, 87, 90, 91, 92, 93, 94, 95 and 96 and C.I. Solubilized Sulfur Brown 1, 4, 5, 8, 10, 11, 12, 14, 15, 16, 21, 26, 28, 31, 51, 52, 56, 60, 75, 80, and 83;

C.I. Sulfur Black 1, 2, 3, 4, 5, 6, 7, 8, 9, 10, 11, 12, 13, 14, 15, 16 and 17;

C.I. Leuco Sulfur Black 1, 2, 6, 9, 10, 11, and 18;

C.I. Solubilized Sulfur Black 1, 2, 5, 7, and 11; and,

C.I. Vat Yellow 21, C.I. Vat Orange 21, C. I Vat Green 7, C.I. Vat Blue 7, 42, 43, Vat Black 11.

A more complete listing of the sulfur dyes and sulfurized vat dyes mentioned hereinabove may be found in the Colour Index, 3rd. Ed., issued by the Society of Dyers and Colourists (London, GB), as well as in the supplementary volumes published thereto and in the Colour Index International, 4$^{th}$ Edition Online which are hereby incorporated by reference.

At least one sulfur dye or sulfurized vat dye listed hereinabove is used to treat aqueous sulfides in the process of the instant invention. More preferably, at least one of C.I. Sulfur Black 1, C.I. Leuco Sulfur Black 1 and C.I. Solubilized Sulfur Black 1 is utilized in accordance with the process to treat sulfides based on economics and availability.

Compounds other than those listed by Colour Index International may exist or be synthesized which chemically qualify as sulfur dyes or sulfurized vat dyes and may be utilized in accordance with the method of this invention. Such compounds might not possess a sufficiently desirable color or fastness to be offered as a dye, yet perform acceptably in the method of this invention. The terms "sulfur dye" and "sulfurized vat dye" as used in this invention include compounds comprised of monocyclic aromatic, heteroaromatic, or quinoid chromophore units; or polycyclic aromatic, heteroaromatic, or quinoid chromophore wherein said chromophore units are connected by disulfide or polysulfide linkages when in the non-reduced form. Sulfur dyes and sulfurized vat dyes can be converted to the reduced (or Leuco) form by reaction with reducing agents such sodium sulfide, sodium dithionite or sodium hydrosulfide. This reaction cleaves the disulfide linkages of the non-reduced (oxidized) dye to form thiolate functional groups (dye-S$^-$). This conversion between disulfide and thiolate functionality is reversible.

A series of examples was carried out to explore the concept of the method for treating aqueous solutions containing sulfide by contacting the aqueous solution containing the sulfide with fibrous materials dyed with sulfur dye and contacting the mixture with atmospheric oxygen. It was discovered that both dyed cotton cloth and dyed paper pulp were very effective in catalyzing the oxidation of the sulfide.

EXAMPLES

Catalyst Preparation for Examples 1-3

A dye bath containing 4 ml of Liquid C. I. Sulfur Black 1, 1 ml of 10% NaOH, 0.2 grams NaHS, and 30 ml of water was heated to 60 degrees C. Undyed cotton linen cloth (1.8 grams) was shredded with scissors and added to the bath and agitated for 5 minutes. The dyed material was removed and rinsed thoroughly in hot water. The dyed cloth material was allowed to air dry. It was black in color.

Example 1: 1 gram of the dry dyed cloth was added to 100 ml of water in a 150 ml beaker. The beaker was placed in a water bath on a stirring hotplate to maintain temperature. When the water reached 40 degrees C., NaHS hydrate was added to produce an initial sulfide concentration of 430 mg/l (as S). Aeration was started immediately. The treatment was tracked using an ORP electrode which had previously been correlated to sulfide concentrations wherein when the ORP reading increased to minus 150 mV, the sulfide concentration was found to be 1 ppm or less. After 53 minutes of treatment, the ORP reading reached −150 mV and the treatment was deemed complete. During the test, some dye had bled from the cloth into the solution making it blue-gray and translucent.

Example 2: The cloth fibers were removed from the Experiment 1 test beaker and the beaker and cloth fibers were rinsed thoroughly. The cloth material was replaced in the beaker and Experiment 1 conditions were repeated. The sulfide was treated, i.e., the ORP reading reached −150 mV, in Experiment 2 in 75 min. The treated solution had some color.

Example 3: The cloth fibers were removed from the Example 2 test beaker and the beaker and fibers were rinsed thoroughly. The cloth material was replaced in the beaker and Example 2 conditions were repeated except that the initial sulfide concentration was 500 mg/l. The sulfide was treated, i.e., the ORP reading reached −150 mV, in Example 3 in 79 min. The treated solution had very slight color.

Without be bound by theory, it is thought that the color of the treated solutions of Examples 1-3 is related to the insufficient rinsing of the dyed cloth prior to Example 1.

Catalyst Preparation for Examples 4-5

One gram of paper towel was placed in a food blender with 0.5 cup (118 mL) water and blended for 2 minutes. The pulp was dyed at approximately 80 degrees C. for 5 minutes in a bath comprising 0.5 mL Liquid C. I. Sulfur Black 1, 1 ml 10% caustic, 0.2 grams NaHS, and hot water to 50 ml volume. The pulp was screened out of the dye bath and rinsed in hot water. The pulp was black in color.

Example 4: The pulp was transferred with 50 ml of water to a 250 ml beaker to which 50 ml of 1000 mg/l sulfide solution was added. The resulting 100 ml of 500 mg/l sulfide solution was aerated and stirred at about 40 degrees C. The sulfide was treated, i.e., the ORP reading reached −150 mV, in Example 4 in 80 min. The pulp was more voluminous than expected and appeared to hinder complete mixing.

Example 5: The pulp was screened out of Example 4, was rinsed and about half (~0.5 gram) was placed in a clean beaker with 50 ml water and 50 ml of sulfide solution containing 1000 mg/l sulfide. The resulting 100 ml of 500 mg/l sulfide solution was aerated and stirred at about 40 degrees C. The sulfide was treated, i.e., the ORP reading reached −150 mV, in Example 5 in 65 min. The water portion from both Examples 4 and 5 was light bluish black and transparent. The pulp was still black.

Example 6: 0.2 gram of blank newsprint and 200 ml of warm water were added to a food blender and blended for 2 minutes. The pulp was screened out and placed in a 150 ml beaker with 9.5 ml hot water, 0.5 ml 10% NaOH, 0.1 gram NaHS hydrate. The beaker was placed on a stirring hotplate to maintain the liquid hot but not boiling. To the beaker, 0.25 ml of Liquid C. I. Sulfur Black 1 dye was added and stirred slowly for 15 minutes. About 100 ml of water was added to the beaker and the contents screened to separate out the pulp. The pulp was rinsed on the screen until the rinse water ran clear. The dyed pulp was black. It was removed from the screen and placed in a 150 ml beaker with 100 ml of water and one drop of 10% NaOH. The beaker was placed in a water bath on a stirring hotplate. The temperature was controlled to about 40 degrees C. NaHS hydrate was added to produce an initial sulfide concentration of about 520 mg/l (as S). Aeration was started. The sulfide was treated, i.e., the ORP reading reached −150 mV, in Example 6 in 93 min. The treated liquid mixture was left in the beaker for use in Example 7.

Example 7: The beaker with treated solution from example 6 was placed on the stirring hotplate and adjusted to about 40 degrees C. with stirring. NaHS hydrate was added to produce an initial sulfide concentration of about 520 mg/l (as S) and aeration was started. The sulfide was treated, i.e., the ORP reading reached −150 mV, in 87 min.

Examples 8-11. The conditions used in Example 7 were repeated 4 more times with NaHS hydrate added to produce a sulfide concentration of about 520 mg/l in the solution for each new example. Treatment, i.e., the ORP reading reached −150 mV, took 85 min, 89 min, 85 min and 91 min, respectively, in Examples 8, 9, 10, and 11. The dyed pulp was still black at the end of the last example. After settling for an hour, the dyed pulp collected in the bottom of the beaker. The supernatant was clear with only a slight blue color.

I claim:

1. A method for treating sulfide in an aqueous liquid comprising contacting the aqueous liquid comprising at least one sulfide with an oxidizer in the presence of a dyed fibrous material, wherein the dyed fibrous material comprises at least one sulfur dye or sulfurized vat dye present in its insoluble oxidized form in and/or on a fibrous material prior to contact with the at least one sulfide in the aqueous liquid to be treated, and wherein said at least one sulfur dye or sulfurized vat dye converts the at least one sulfide in the aqueous liquid to at least one non-toxic product and a treated liquid is produced that has a reduced concentration of the at least one sulfide.

2. The method of claim 1, wherein the at least one sulfide is selected from the group consisting of bisulfide ions, sulfide ions, polysulfide ions and mixtures thereof.

3. The method of claim 1, wherein said sulfur dye or sulfurized vat dye is selected from the group consisting of Sulfur Black 1, Leuco Sulfur Black 1, Solubilized Sulfur Black 1, and mixtures thereof.

4. The method of claim 1, wherein said oxidizer comprises oxygen or an oxygen-containing gas.

5. The method of claim 1, wherein the at least one sulfide comprises bisulfide ions.

6. The method of claim 1, wherein the at least one non-toxic product comprises thiosulfate ions.

7. The method of claim 1, wherein the dyed fibrous material comprises at least one of a cellulosic fiber, a synthetic staple fiber, or an animal-based fiber.

8. The method of claim 7, wherein the dyed fibrous material comprises at least one of cotton, wood, paper, pulp, polyolefins, polyesters, polyamides, poly(lactic acid), cellulose derivatives, hair, or wool.

9. The method of claim 1, wherein the dyed fibrous material comprises pulp fibers.

10. The method of claim 1, wherein the aqueous liquid has a pH in a range from about 7 to about 11.

11. The method of claim 10, wherein the pH is maintained by adding at least one base selected from the group consisting of sodium hydroxide, potassium hydroxide, ammonia, ammonium hydroxide, calcium hydroxide, magnesium hydroxide, and any combination thereof.

12. The method of claim 1, wherein the method operates continuously or as batch processes.

13. The method of claim 1, wherein elemental sulfur is not precipitated during oxidation of the at least one sulfide.

14. The method of claim 1, wherein the method does not require any electrolytic processing.

15. The method of claim 1, further comprising separating the dyed fibrous material from the treated liquid.

16. The method of claim 15, wherein the dyed fibrous material is reused.

17. The method of claim 1, wherein the aqueous liquid comprises wastewater selected from the group consisting of oilfield wastewater; oil production wastewater; gas production wastewater;
  impoundment wastewater; anaerobic or facultative wastewater treatment operations including human, animal and industrial wastes; raw municipal wastewater; and any combination thereof.

18. The method of claim 1, further comprising introducing a gas comprising hydrogen sulfide to an aqueous liquid to absorb at least a portion of the hydrogen sulfide to form the aqueous liquid comprising at least one sulfide prior to contacting the aqueous liquid comprising at least one sulfide with an oxidizer in the presence of the dyed fibrous material.

19. The method of claim 18, wherein the gas comprising hydrogen sulfide comprises a biogas.

* * * * *